(12) United States Patent
Watanabe et al.

(10) Patent No.: US 8,554,101 B2
(45) Date of Patent: Oct. 8, 2013

(54) POWER SUPPLY APPARATUS AND IMAGE FORMING APPARATUS

(75) Inventors: Hiroyuki Watanabe, Nishisonogi-gun (JP); Soichiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 333 days.

(21) Appl. No.: 13/008,864

(22) Filed: Jan. 18, 2011

(65) Prior Publication Data

US 2011/0188878 A1 Aug. 4, 2011

(30) Foreign Application Priority Data

Feb. 4, 2010 (JP) .................................. 2010-023547

(51) Int. Cl.
*G03G 15/00* (2006.01)
(52) U.S. Cl.
USPC ............................................................ 399/88
(58) Field of Classification Search
USPC .............. 399/37, 50, 55, 66, 75, 88; 310/318;
315/55, 209 PZ; 323/355, 359; 363/16,
363/39–41
See application file for complete search history.

(56) References Cited

U.S. PATENT DOCUMENTS

| 4,942,600 | A | 7/1990 | Suzuki |
| 5,138,655 | A | 8/1992 | Takashima et al. |
| 5,481,705 | A | 1/1996 | Watanabe et al. |
| 5,535,418 | A | 7/1996 | Suzuki |
| 5,586,172 | A | 12/1996 | Sakurai et al. |
| 5,594,944 | A | 1/1997 | Ogata et al. |
| 5,602,910 | A | 2/1997 | Tsutsui et al. |
| 5,859,489 | A * | 1/1999 | Shimada ....................... 310/318 |
| 5,884,077 | A | 3/1999 | Suzuki |
| 5,918,011 | A | 6/1999 | Watanabe et al. |
| 5,923,542 | A * | 7/1999 | Sasaki et al. ..................... 363/16 |
| 7,265,479 | B2 * | 9/2007 | Yamaguchi et al. .......... 310/318 |
| 7,557,488 | B2 * | 7/2009 | Yamaguchi .................. 310/318 |
| 7,731,904 | B2 | 6/2010 | Okamoto et al. |
| 8,213,823 | B2 * | 7/2012 | Yamamoto ..................... 399/88 |
| 2008/0297820 | A1 | 12/2008 | Karino et al. |
| 2010/0267589 | A1 | 10/2010 | Okamoto et al. |

FOREIGN PATENT DOCUMENTS

JP 11-206113 A 7/1999

* cited by examiner

*Primary Examiner* — Hoan Tran
(74) *Attorney, Agent, or Firm* — Fitzpatrick, Cella, Harper & Scinto (57) ABSTRACT

A power supply apparatus needs to control an output voltage to a target voltage for a short time. A power supply apparatus of the present invention detects voltages output from a piezoelectric transformer. The power supply apparatus also detects peak values in a plurality of detected voltages according to a plurality of frequencies of pulse signals for the piezoelectric transformer, and identifies a frequency corresponding to the highest peak value, and a frequency corresponding to a next peak value next to and on a higher- or lower-frequency side of the frequency corresponding to the highest peak value. Moreover, the power supply apparatus sets an initial frequency used when starting to control the output voltage of the piezoelectric transformer to the target voltage, within a frequency range between the two identified frequencies.

8 Claims, 8 Drawing Sheets

POWER SUPPLY APPARATUS AND IMAGE FORMING APPARATUS

BACKGROUND OF THE INVENTION

1. Field of the Invention

The present invention relates to power supply apparatuses and image forming apparatuses using the power supply apparatuses.

2. Description of the Related Art

In conventional electrophotographic image forming apparatuses, a wire-wound electromagnetic transformer has been used as a power supply apparatus to generate a high voltage required in image forming processes, such as transfer and the like. In the power supply apparatus using the electromagnetic transformer, for example, a transformer winding needs to be insulated using a mold or the like, and a relatively large transformer is required, whereby the reduction of size and weight of the power supply apparatus is prevented. Therefore, a piezoelectric transformer that is used as a power supply apparatus to generate a high voltage has been studied as an alternative to the electromagnetic transformer (see Japanese Patent Laid-Open No. 11-206113). Piezoelectric transformers, which are made of ceramics, have a thin thickness and a light weight, and are capable of generating a high voltage with higher efficiency than that of the electromagnetic transformer. Also, piezoelectric transformers do not require a molding process for insulation that is required for the electromagnetic transformer, and therefore, are useful in achieving a reduction in size and weight of a power supply apparatus that can output a high voltage.

Piezoelectric transformers have specific resonance characteristics that are determined based on the structural characteristics, such as dimensions and the like, and output from the secondary side a voltage according to the frequency of a drive signal input to the primary side. For example, a voltage-controlled oscillator (VCO) is coupled to the piezoelectric transformer, and the frequency of a drive signal output from the VCO is varied, thereby varying the output voltage of the piezoelectric transformer. By thus controlling the piezoelectric transformer, the output voltage of the piezoelectric transformer can be set to a target voltage.

In general, when piezoelectric transformers are used as a power supply apparatus, the frequency range of the drive signal from the VCO is set to a range including a resonance frequency in order to obtain a predetermined range of output voltages from the piezoelectric transformer where the output voltage takes the highest value when the piezoelectric transformer resonates. Also, by changing the frequency of the drive signal from the VCO, the output voltage of the piezoelectric transformer is set to a target voltage. In order to set the output voltage of the piezoelectric transformer to a target voltage, the VCO determines the amount of change in the frequency of the drive signal output to the piezoelectric transformer based on, for example, a difference value between the output voltage fed back from the piezoelectric transformer and the target voltage. Specifically, the VCO decreases the amount of change in the frequency of the drive signal when the difference value is small, and increases the amount of change in the frequency of the drive signal when the difference value is large. By thus changing the drive frequency of the VCO, the output voltage of the piezoelectric transformer can be caused to approach the target voltage in a stepwise manner.

The above conventional techniques, however, have the following problems. For example, if frequency characteristics corresponding to the relationship between frequencies and output voltages of the piezoelectric transformer indicate that a spurious frequency component is present in frequency components other than the resonance frequency, a rise time that is required for controlling the output voltage of the piezoelectric transformer to a target voltage by changing the frequency of the drive signal, disadvantageously increases. Specifically, when the VCO changes the frequency of the drive signal from an initial frequency to a target frequency corresponding to the target voltage, then if a spurious frequency is present between the initial frequency and the target frequency, the output voltage of the piezoelectric transformer temporarily increases at the spurious frequency. In this case, the difference value between the output voltage and the target voltage of the piezoelectric transformer decreases, and therefore, the amount of change in the drive frequency temporarily decreases. As a result, the rise time that it takes to change the drive frequency to the target frequency disadvantageously increases.

SUMMARY OF THE INVENTION

The present invention has been made in view of the above problems. The present invention provides a power supply apparatus in which, when the output voltage is controlled to a target voltage, the influence of a spurious frequency of the piezoelectric transformer is suppressed, whereby a time that it takes to reach the target voltage is reduced.

One aspect of the present invention provides a power supply apparatus comprising: a pulse generation unit that generates a pulse signal; a piezoelectric transformer that outputs a voltage according to a frequency of the pulse signal generated by the pulse generation unit; a control unit that controls the frequency of the pulse signal; a voltage detection unit that detects a plurality of voltages that are output from the piezoelectric transformer; a peak value detection unit that detects a plurality of peak values in the output voltages of the piezoelectric transformer according to a plurality of frequencies of the pulse signal; an identification unit that identifies a frequency corresponding to the highest peak value of the plurality of peak values detected by the peak value detection unit, and a frequency corresponding to a next peak value next to and on a higher- or lower-frequency side of the frequency corresponding to the highest peak value; and a setting unit that sets an initial frequency of the pulse signal that is used to cause the output voltage of the piezoelectric transformer to approach a target voltage, within a frequency range between the frequency corresponding to the highest peak value and the frequency corresponding to the next peak value identified by the identification unit, wherein the control unit further controls the pulse generation unit so that, when causing the output voltage of the piezoelectric transformer to approach the target voltage, the frequency of the pulse signal generated by the pulse generation unit is changed from the initial frequency set by the setting unit.

Another aspect of the present invention provides an image forming apparatus comprising: a power supply apparatus including a pulse generation unit that generates a pulse signal, and a piezoelectric transformer that outputs a voltage according to a frequency of the pulse signal generated by the pulse generation unit; and an image forming unit that forms an image on a recording paper, wherein the power supply apparatus is used as a power supply for the image forming performed by the image forming unit, wherein the power supply apparatus includes a control unit that controls the frequency of the pulse signal; a voltage detection unit that detects a plurality of voltages output from the piezoelectric transformer; a peak value detection unit that detects a plurality of peak values in the output voltages of the piezoelectric transformer according to a plurality of frequencies of the pulse signal; an identification unit that identifies a frequency corresponding to the highest peak value of the plurality of peak values detected by the peak value detection unit, and a frequency corresponding to an next peak value next to and on a higher- or lower-frequency side of the frequency corresponding to the highest peak value; and a setting unit that sets an initial frequency of the pulse signal that is used to cause the output voltage of the piezoelectric transformer to approach a target voltage, within a frequency range between the frequency corresponding to the highest peak value and the frequency corresponding to the next peak value identified by the identification unit, and wherein the control unit further controls the pulse generation unit so that, when causing the output voltage of the piezoelectric transformer to approach the target voltage, the frequency of the pulse signal generated by the pulse generation unit is changed from the initial frequency set by the setting unit.

According to the present invention, a power supply apparatus can be provided in which, for example, when the output voltage is controlled to a target voltage, the influence of a spurious frequency of the piezoelectric transformer is suppressed, whereby a time that it takes to reach the target voltage is reduced.

Further features of the present invention will become apparent from the following description of exemplary embodiments (with reference to the attached drawings).

DESCRIPTION OF THE EMBODIMENTS

Embodiments of the present invention will be described hereinafter. The embodiments described below will help in understanding the various concepts, such as a broader concept, an intermediate concept, a narrower concept, and the like, of the present invention. Also, the technical scope of the present invention is determined based on the scope of the claims and is not limited by the embodiments described below.

[First Embodiment]

A first embodiment of the present invention will be described hereinafter with reference to FIGS. 1-9. In this embodiment, as an example of a power supply apparatus of the present invention, a high voltage power supply apparatus used in an image forming apparatus will be described.

<Configuration of High Voltage Power Supply Apparatus>

Firstly, a circuit configuration of a high voltage power supply apparatus including a piezoelectric transformer will be described with reference to FIG. 1. The high voltage power supply apparatus 202 including the piezoelectric transformer 101 is controlled by a DC controller 201 to output a high voltage $V_{out}$. In this embodiment, as an example, the DC controller 201 having a function of controlling the high voltage power supply apparatus 202 is separated from the high voltage power supply apparatus 202 and is provided in an image forming apparatus as described below. Note that the DC controller 201 may be integrated with and incorporated in the high voltage power supply apparatus 202.

Figure 3:
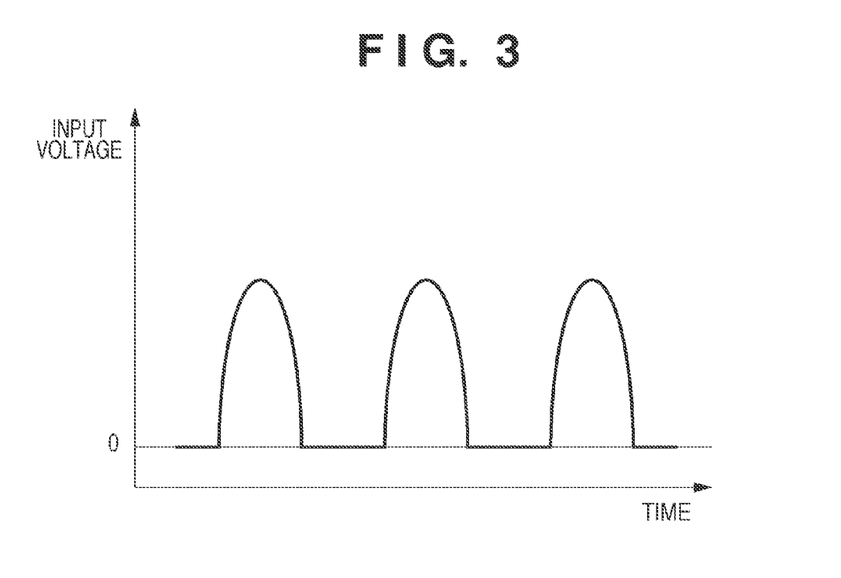
FIG. 3 is a diagram showing an example of a waveform of a pulse signal input to a piezoelectric transformer 101 according to the first embodiment.

The high voltage power supply apparatus 202, which is an example of the piezoelectric transformer type power supply apparatus, outputs the high output voltage $V_{out}$ according to the frequency of a drive signal (pulse signal) supplied from the DC controller 201. The DC controller 201 switches a transistor 111 at the frequency (drive frequency) of the pulse signal, and supplies a voltage amplified by an inductor 112 to the primary side of the piezoelectric transformer 101. Here, a pulse-like voltage having a predetermined drive frequency as shown in FIG. 3 is supplied to the piezoelectric transformer 101. A high voltage output from the secondary side of the piezoelectric transformer 101 is rectified to a voltage having a positive polarity by diodes 102 and 103 and a high voltage capacitor 104 before being supplied to loads, such as a transfer roller and the like, in the image forming apparatus. The output voltage is also divided by resistors 105, 106, and 107, and then input via a protective resistor 108 to the DC controller 201.

In the DC controller 201, a storage unit 2051 is a storage device that stores various data required for control performed by the high voltage power supply apparatus 202. Specifically, the storage unit 2051 stores drive frequencies of the piezoelectric transformer 101, and values of output voltages of the piezoelectric transformer 101 that have been subjected to rectification and then A/D conversion using an A/D converter 2055. The storage unit 2051 also stores data output from a CPU 207, and outputs the stored data to parts other than the CPU 207 in accordance with control performed by the CPU 207.

Figure 4:
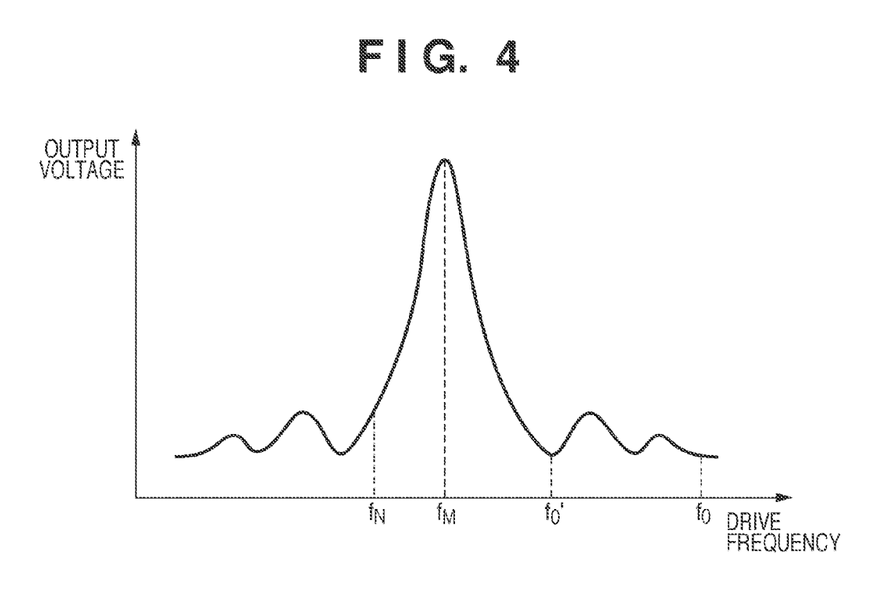
FIG. 4 is a diagram showing exemplary frequency characteristics of the piezoelectric transformer 101 of the first embodiment.

A measurement start signal generation unit 2052 uses the data that has been stored from the CPU 207 to the storage unit 2051 to generate a signal for starting a sweep operation, and sends the generated signal to a timing generation unit 2053. As used here, the sweep operation refers to an operation of receiving (detecting) voltages output by the piezoelectric transformer 101 while switching, to the various values, the drive frequency of the pulse signal to be sent to the piezoelectric transformer 101. As a result, for example, frequency characteristics of the piezoelectric transformer 101 as shown in FIG. 4 described below can be obtained.

The timing generation unit 2053, when receiving the measurement start signal from the measurement start signal generation unit 2052, generates a timing signal indicating a timing at which the frequency of the pulse signal to be sent to the piezoelectric transformer 101 is to be switched. The timing generation unit 2053 sends the generated timing signal to a frequency generation unit 2054. The frequency generation unit 2054 generates pulse signals for driving the high voltage power supply apparatus 202 while switching the frequency of the pulse signal in accordance with the timing signal received from the timing generation unit 2053, and outputs the generated pulse signals to the high voltage power supply apparatus 202.

The output signal from the high voltage power supply apparatus 202 is output as the output voltage $V_{out}$, and is input to the A/D converter 2055 of the DC controller 201. The A/D converter 2055 detects an analog signal output from the piezoelectric transformer 101, and converts the detect signal into a digital signal (A/D conversion). For example, the A/D converter 2055 performs A/D conversion by dividing the output voltage of the piezoelectric transformer 101 and then causing the resultant voltage to pass through a rectification element. A signal value after the A/D conversion is stored into the storage unit 2051.

A peak value detection unit 2056 detects peak values (local maximum and local minimum values) of the output voltage values based on the output voltage values and the frequencies of the drive pulse signal that have been obtained by the sweep operation and then stored into the storage unit 2051. As described below, a frequency control range identification unit 2058 identifies the control range of the drive frequency that is used during a voltage control for causing the output voltage of the piezoelectric transformer 101 to approach a target voltage, based on the result of the peak value detection performed by the peak value detection unit 2056.

Note that detailed operations of the DC controller 201 and the high voltage power supply apparatus 202 of this embodiment will be described below.

<Configuration of Image Forming Apparatus>

Next, a configuration and an operation of an electrophotographic full-color (multi-color) laser printer 401 including the high voltage power supply apparatus 202 of FIG. 1 as an example of the image forming apparatus including the high voltage power supply of the present invention will be described with reference to FIG. 2. Note that the image forming apparatus of the present invention is applicable to a monochrome (single-color) image forming apparatus. The image forming apparatus may be a MFP (multi-function peripherals).

In the laser printer 401, a deck 402 contains a recording paper 32, and a deck paper presence sensor 403 detects the recording paper 32 contained in the deck 402. A pickup roller 404 picks up the recording paper 32 from the deck 402 and sends out the recording paper 32 to a conveyance path. The recording paper 32 picked up from the deck 402 is conveyed in the conveyance path by a deck feed roller 405. Here, a retard roller 406 prevents a plurality of recording papers 32 from being conveyed while sticking together.

A pair of registration rollers 407 that conveys the recording paper 32 in synchronization with timing of image formation, and a pre-registration sensor 408 that detects a conveyed state of the recording paper 32 to the registration roller pair 407, are provided in the conveyance path downstream from the deck feed roller 405. A plurality of image forming units corresponding to four respective colors (Y: yellow, M: magenta, C: cyan, and Bk: black) are provided along an electrostatic adsorptive conveying transfer belt (hereinafter referred to as an "ETB") 409 that is provided in the conveyance path downstream from the registration roller pair 407. The image forming units include scanner units 420Y, 420M, 420C, and 420Bk that perform exposure in accordance with image signals corresponding to the respective colors, and process cartridges 410Y, 410M, 410C, and 410Bk that form images using toners, respectively. The images formed by the image forming units are successively transferred and stacked on the recording paper 32 placed on the ETB 409 by transfer rollers 430Y, 430M, 430C, and 430Bk. As a result, a full-color toner image is formed on the recording paper 32. After the transfer process, the recording paper 32 is further conveyed downstream in the conveyance path. A fixing roller 433 including a heater 432 for heating and a pair of pressure rollers 434 that are used to thermally fix the toner image transferred on the recording paper 32, are provided downstream from the image forming units. Moreover, a pair of fixing/discharge rollers 435 for conveying the recording paper 32 from the fixing roller 433, and a fixing/discharge sensor 436 for detecting the conveyed recording paper 32, are provided in the conveyance path downstream from the fixing roller 433 and the pressure roller pair 434.

Each scanner unit 420 includes a laser unit 421 that emits laser light modulated based on a corresponding image signal from a video controller 440, and an optical system that scans a corresponding photosensitive drum 305 with the laser light from the corresponding laser unit 421. The optical system includes a polygon mirror 422, a scanner motor 423, and imaging lenses 424. Each process cartridge 410 includes the photosensitive drum 305, a charging roller 303, and a development roller 302, and a toner container 411, which are required for an electrophotographic process. Each process cartridge 410 is detachable from the laser printer 401. Note that the video controller 440 transforms image data input from an external device 441, such as a personal computer or the like, into bitmap data to generate an image signal for image formation.

Figure 1:
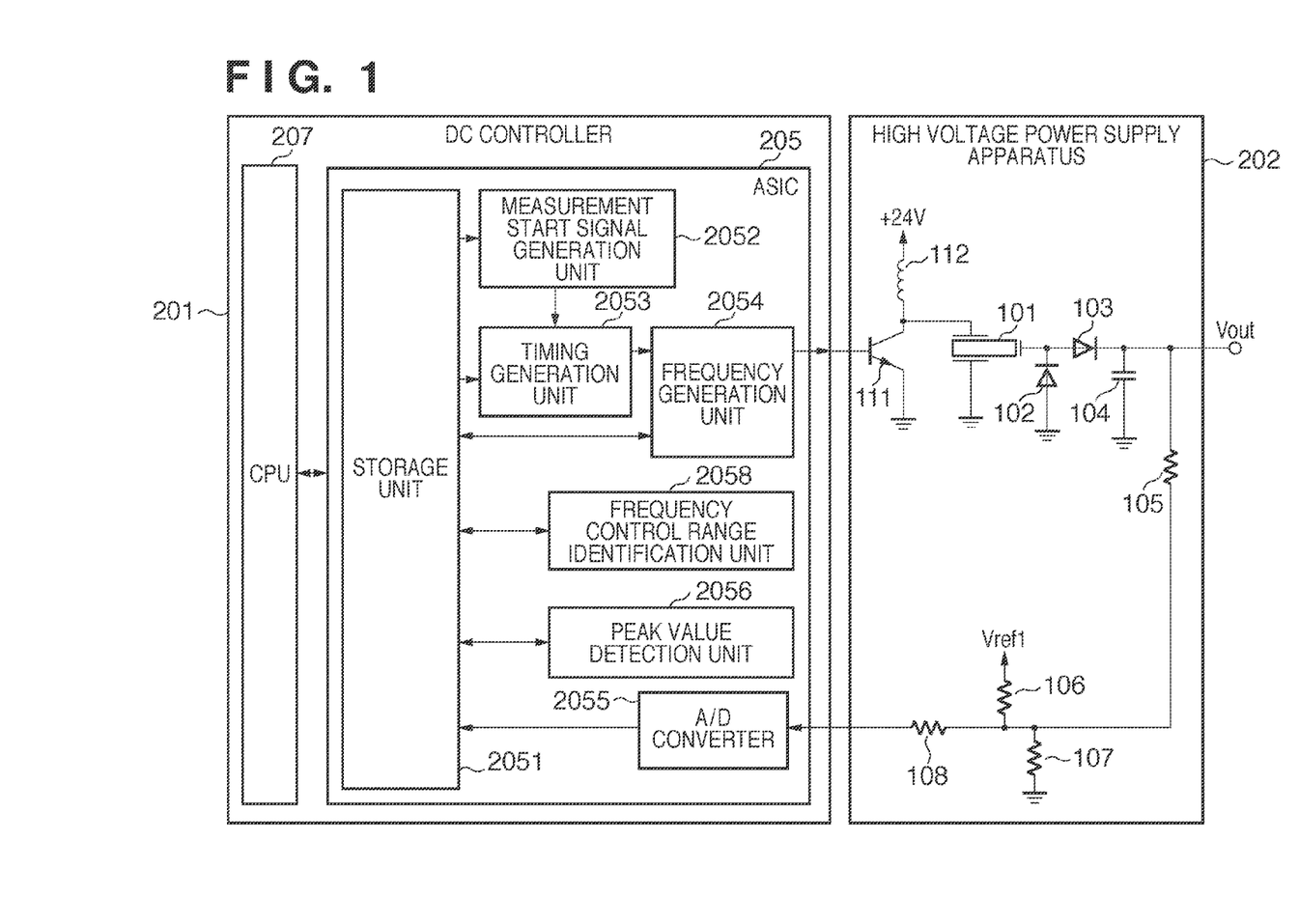
FIG. 1 is a diagram showing an example of a configuration of a DC controller 201 and a high voltage power supply apparatus 202 according to a first embodiment.

As also shown in FIG. 1, the DC controller 201 include the CPU 207, an application-specific integrated circuit (ASIC) 205, other input/output control circuits (not shown), and the like, which intercommunicate with each other via a bus. The ASIC 205 and the CPU 207 are digital elements that control the high voltage power supply apparatus 202 and an environment detection unit 450. The environment detection unit 450 includes various sensors, and measures data (e.g., temperature or humidity) relating to an environment around the high voltage power supply apparatus 202 provided in the laser printer 401, as an environment condition. The high voltage power supply apparatus 202 includes a high voltage power supply for charging and a high voltage power supply for development that output high voltages corresponding to the process cartridges 410Y, 410M, 410C, and 410Bk. The high voltage power supply apparatus 202 also includes a high voltage power supply for transfer that outputs high voltages corresponding to the transfer rollers 430Y, 430M, 430C, and 430Bk. The power supply apparatus of the present invention is applicable to any of these high voltage power supplies.

<Operation of High Voltage Power Supply Apparatus>

Figure 7:
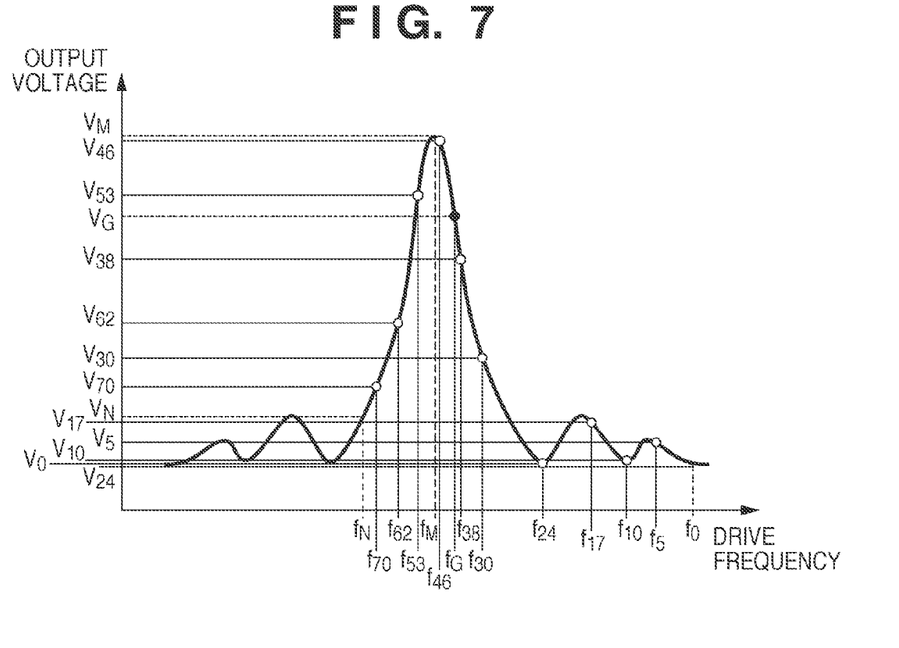
FIG. 7 is a diagram showing exemplary frequency characteristics obtained by a sweep operation performed with respect to the piezoelectric transformer 101 of the first embodiment.

Next, a control of the piezoelectric transformer 101 in this embodiment will be described. Firstly, the piezoelectric transformer 101 typically has frequency characteristics as shown in FIG. 4, and varies the output voltage according to the frequency of an input pulse signal. The piezoelectric transformer 101 outputs the highest maximum voltage at a specific resonance frequency $f_M$ that is determined by structural characteristics thereof. As shown in FIG. 7, the piezoelectric transformer 101 also has a plurality of frequency peaks around the resonance frequency $f_M$, which correspond to spurious components.

In the high voltage power supply apparatus 202 having the piezoelectric transformer 101, a control range within which the drive frequency is varied is previously set so that the output voltage is changed and controlled to a target voltage. For example, in order to increase the dynamic range of the output voltage as much as possible, the control range of the drive frequency may be set to a range ($f_0$-$f_N$) including the resonance frequency $f_M$ as shown in FIG. 7. Also, in order to suppress the influence of variations in the resonance frequency $f_M$ of each piezoelectric transformer 101 that is caused by variations in characteristics during manufacture of the piezoelectric transformer 101, the control range may need to be set to such a range that includes the resonance frequency $f_M$.

If, however, the control range of the drive frequency includes a spurious component, it takes a longer time for the output voltage of the piezoelectric transformer 101 to reach a target voltage (in other words, for the drive frequency to reach a target frequency) as described above. Therefore, in this embodiment, the control range of the drive frequency of the piezoelectric transformer 101 is set to one that does not include a spurious component, thereby suppressing the influence of a spurious component and thus reducing the time that it takes for the output voltage to reach a target voltage.

More specifically, initially, before starting the voltage control for causing the output voltage to approach a target voltage, the sweep operation is performed with respect to frequencies within the predetermined frequency range of the pulse signal, thereby obtaining the frequency characteristics of the output voltage of the piezoelectric transformer 101. Next, a plurality of peak values (local maximum and local minimum values) are detected from a plurality of detected changes in the output voltage depending on the frequency of the pulse signal in the obtained frequency characteristics. A frequency corresponding to the highest maximum value of the detected peak values, and a frequency (e.g., $f_0'$ in FIG. 4) corresponding to a local minimum value (next peak value) next to and on the higher- or lower-frequency side of the drive frequency corresponding to the highest peak value, are identified. The frequency range between the identified frequencies is set as the control range of the drive frequency (e.g., $f_M$-$f_0'$ of FIG. 4), and any frequency within the control range is set as an initial value that is used when the output voltage of the piezoelectric transformer 101 is controlled. By such a process, the initial value of the drive frequency (the initial frequency) is set within a frequency range that does not include a spurious component, whereby the influence of a spurious component on the rise time can be suppressed.

Figure 5:
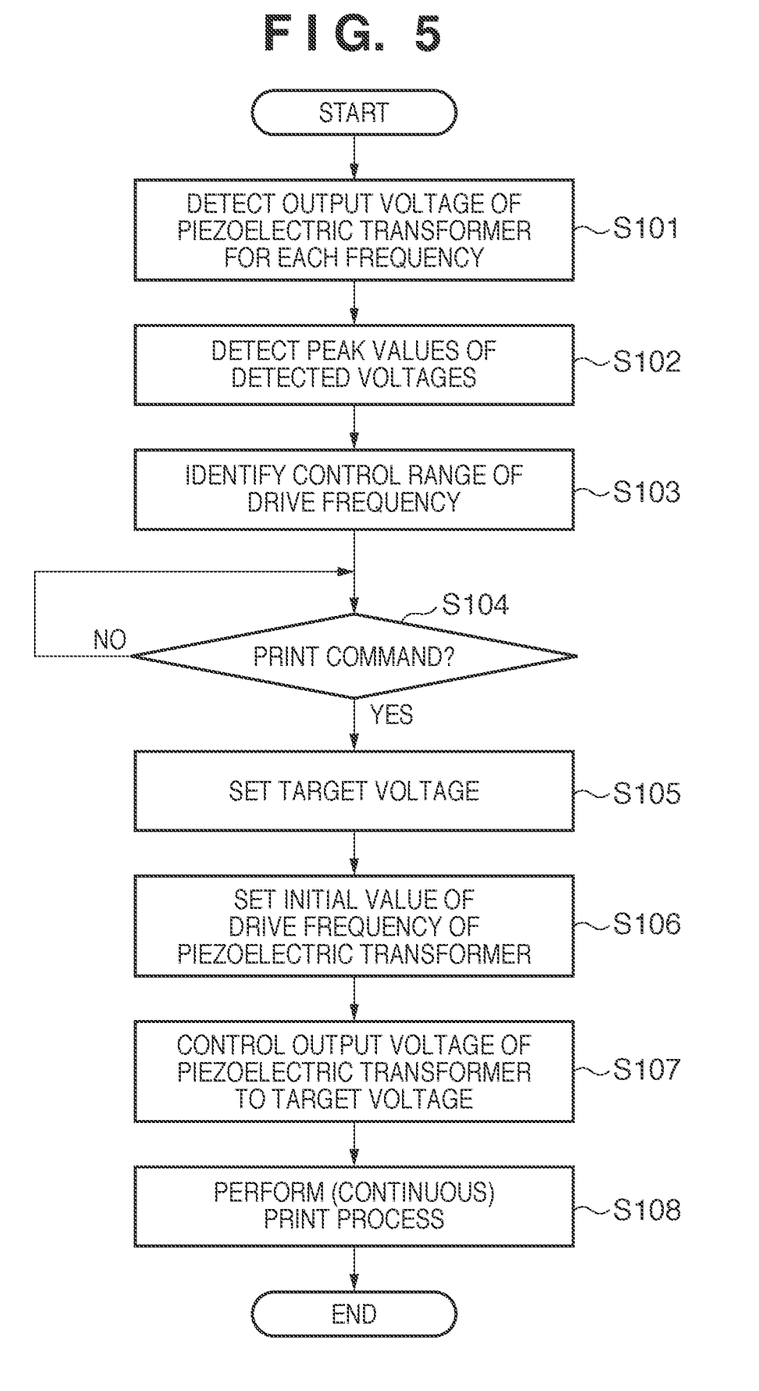
FIG. 5 is a flowchart showing a procedure of setting an initial value of a drive frequency for the piezoelectric transformer 101 of the first embodiment.
Figure 6:
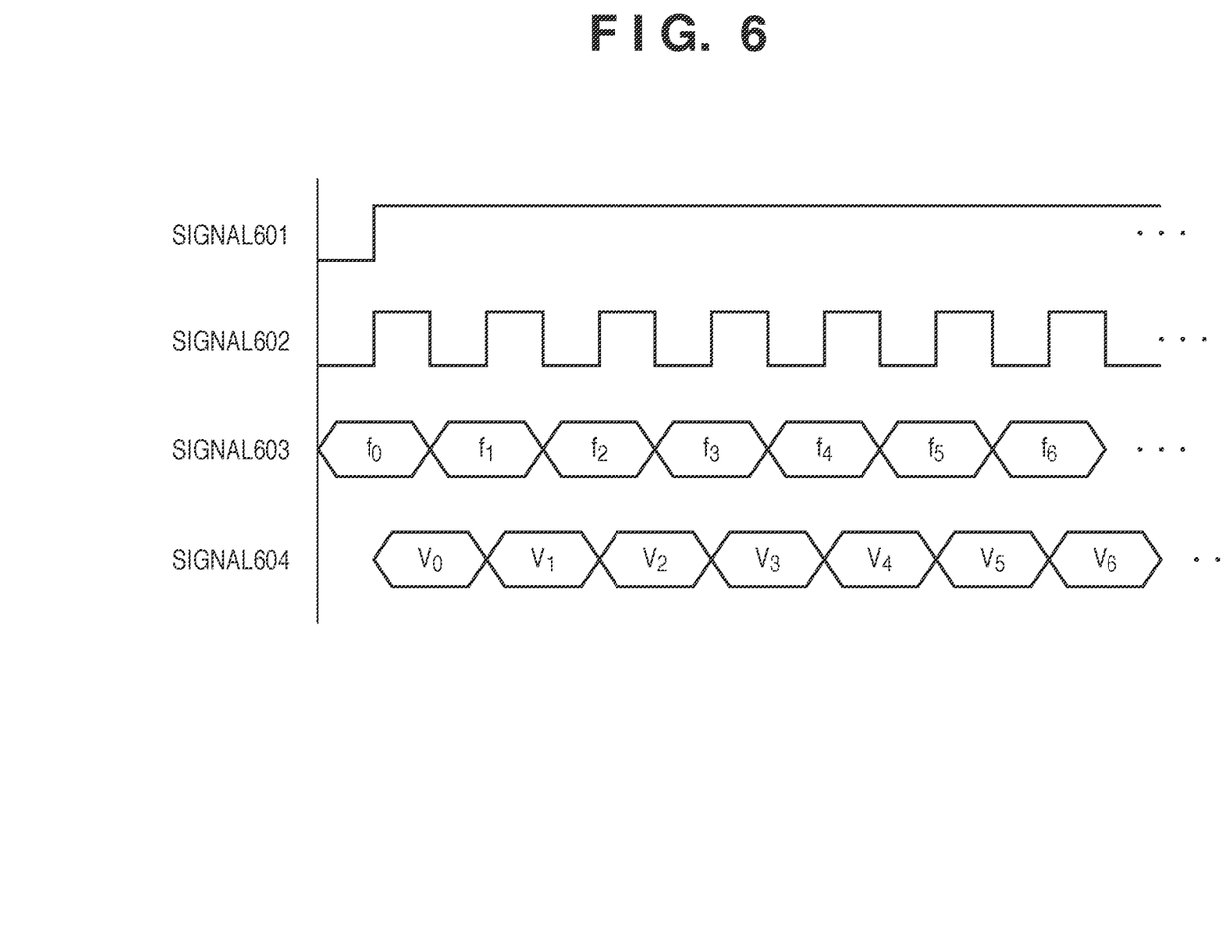
FIG. 6 is a diagram showing an example of a signal waveform at each portion of FIG. 1.

The control of the high voltage power supply apparatus 202 of this embodiment will be more specifically described with reference to a flowchart shown in FIG. 5. In this embodiment, each step of FIG. 5 is performed based on a control performed by the DC controller 201.

In S101, the DC controller 201 performs the sweep operation to detect each output voltage of the piezoelectric transformer 101 for each frequency of the pulse signal input to the piezoelectric transformer 101. In S101, the CPU 207 controls the measurement start signal generation unit 2052 so that the measurement start signal generation unit 2052 generates a measurement start signal (601 in FIG. 6) for starting measurement by the sweep operation and outputs the generated signal to the timing generation unit 2053. The timing generation unit 2053, when detecting a rise of the measurement start signal, outputs to the frequency generation unit 2054 a timing signal (602 in FIG. 6) that indicates a timing at which the frequency of the pulse signal output to the piezoelectric transformer 101 is switched. Note that a value previously stored in the storage unit 2051 is used as the frequency switching timing.

The CPU 207 controls the frequency generation unit 2054 so that the frequency generation unit 2054 generates pulse signals (603 in FIG. 6) while successively switching the frequency in synchronization with the timing signal input from the timing generation unit 2053. In order to generate a plurality of frequencies within the predetermined range, the CPU 207 reads out a plurality of frequencies ($f_0$-$f_N$) within the range previously stored in the storage unit 2051, and inputs those frequencies to the frequency generation unit 2054. For example, as shown in FIG. 7, the frequency generation unit 2054 generates (N+1) pulse signals having different frequencies ranging from $f_0$ to $f_N$. Thus, in this embodiment, the CPU 207 functions as a control unit, and the frequency generation unit 2054 functions as a pulse generation unit.

When the pulse signal generated by the frequency generation unit 2054 is input to the high voltage power supply apparatus 202, the piezoelectric transformer 101 in the high voltage power supply apparatus 202 outputs a voltage (signal 604 in FIG. 6) corresponding to the frequency of the pulse signal. For example, the piezoelectric transformer 101 outputs voltages $V_0$-$V_N$ corresponding to the frequencies $f_0$-$f_N$ of FIG. 7. The output voltage is to be output as the output voltage $V_{out}$, and is also to be input to the DC controller 201 and detected by the A/D converter 2055. The A/D converter 2055 converts the detected output voltage into a digital signal, and thereafter, temporarily stores the digital signal into the storage unit 2051. Thus, the DC controller 201 obtains frequency characteristics of the piezoelectric transformer 101 as shown in FIG. 7. Thereafter, control proceeds from S101 to S102. Thus, in this embodiment, the A/D converter 2055 functions as a voltage detection unit. Note that, in S101, in order to obtain frequency characteristics having a sufficient resolution, it may be necessary to obtain output voltage data for as many frequencies as possible within the predetermined frequency range.

Figure 8:
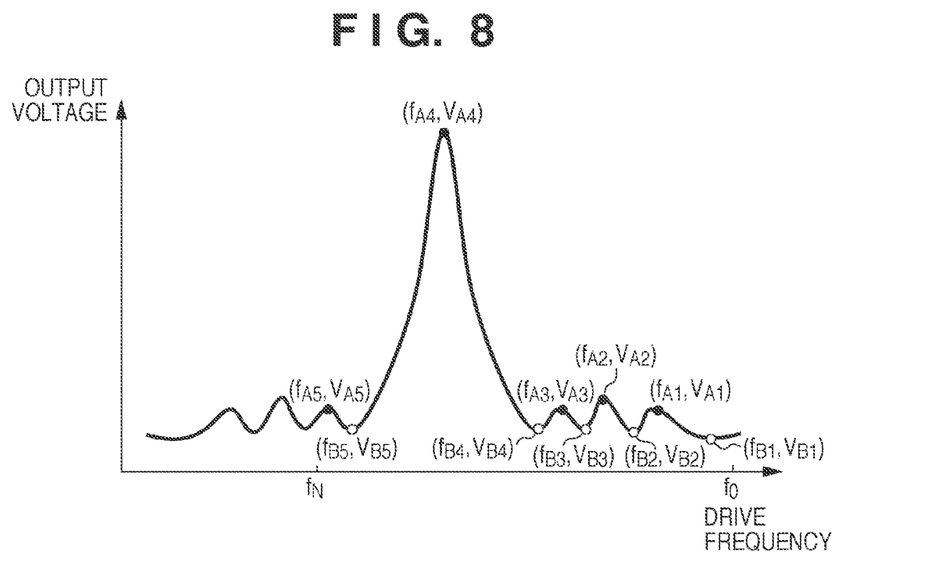
FIG. 8 is a diagram showing peak values obtained from the frequency characteristics of the piezoelectric transformer 101 of the first embodiment.

In S102, the CPU 207 controls the peak value detection unit 2056 so that the peak value detection unit 2056 detects a plurality of peak output voltage values from changes, depending on the drive frequency, in a plurality of detected output voltages from the piezoelectric transformer 101. For example, as shown in FIG. 8, the peak value detection unit 2056 detects local maximum values ($f_{A1}$, $V_{A1}$) to ($f_{A5}$, $V_{A5}$) and local minimum values ($f_{B1}$, $V_{B1}$) to ($f_{B5}$, $V_{B5}$) within the predetermined frequency range $f_0$-$f_N$. Note that these peak values can be detected based on changes in the polarity of the inclination of the output voltage calculated between output voltage values corresponding to adjacent drive frequencies. The peak value detection unit 2056 stores data of the detected peak values into the storage unit 2051. Note that the output voltage data from which the peak value detection unit 2056 has detected peak values may be erased from the storage unit 2051 or may be overwritten with other data, thereby improving the use efficiency of a storage area in the storage unit 2051. Thereafter, control proceeds from S102 to S103.

In S103, the CPU 207 controls the frequency control range identification unit 2058 so that, based on the result of the peak value detection by the peak value detection unit 2056, the frequency control range identification unit 2058 identifies the control range of the drive frequency that is to be used when the voltage control for causing the output voltage of the piezoelectric transformer 101 to approach a target voltage is performed. Specifically, the frequency control range identification unit 2058 identifies, of a plurality of peak values detected by the peak value detection unit 2056, a frequency corresponding to the highest peak value, and a frequency corresponding to a next peak value next to and on a higher- or lower-frequency side of the frequency corresponding to the highest peak value. As a result, for example, as shown in FIG. 8, the frequency $f_{A4}$ is identified as the frequency corresponding to the highest peak value ($V_{A4}$). Also, the frequency $f_{B4}$ or $f_{B5}$ is identified as the frequency corresponding to a next peak value ($V_{B4}$ or $V_{B5}$) next to and on the higher- or lower frequency side of the frequency $f_{A4}$. Here, when it is assumed that the frequency corresponding to the higher-frequency-side next peak value is identified, a range $f_{A4}$-$f_{B4}$ is identified as the control range of the drive frequency that does not include a spurious component. Thereafter, control proceeds from S103 to S104.

In S104, the CPU 207 of the DC controller 201 determines whether or not it has received a print command. For example, the print command is sent from an operation unit of the laser printer 401 to the CPU 207 in response to a print start command input by the user using the operation unit. In S104, the CPU 207 repeats the determination process of S104 as long as the CPU 207 determines that a print command has not been received. On the other hand, when the CPU 207 determines that a print command has been received, control proceeds to S105.

In S105, the CPU 207 determines, from data stored in the storage unit 2051 or the like, a voltage required for each load in the image forming process, and sets a target voltage $V_G$ for the output voltage of the high voltage power supply apparatus 202. Moreover, in S106, the CPU 207 sets the initial value of the frequency of a pulse signal that is to be used when starting the voltage control for causing the output voltage of the piezoelectric transformer 101 to approach a target voltage. Here, the CPU 207 sets the initial value within the frequency range identified in S103. As an example, a frequency located at an end of the frequency range can be set as the initial value. As a result, the initial value of the drive frequency is set within the frequency range that does not include a spurious component, and therefore, the time that it takes for the output voltage of the piezoelectric transformer 101 to rise and reach a target voltage can be reduced.

Figure 9:
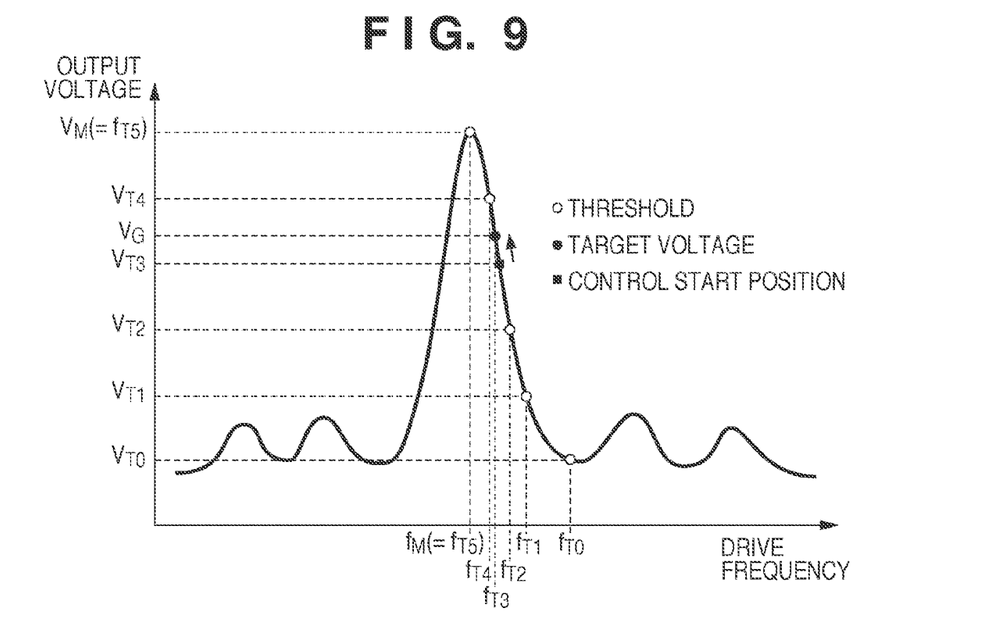
FIG. 9 is a diagram for describing setting of the initial value of the drive frequency for the piezoelectric transformer 101 of the first embodiment.

In this embodiment, the rise time of the output voltage of the piezoelectric transformer 101 may be further reduced by the following process. Specifically, a plurality of predetermined threshold voltages that are used to divide the range of the voltage output from the piezoelectric transformer 101 into a plurality of ranges are stored in the storage unit 2051 in advance. For example, as shown in FIG. 9, voltages $V_{T0}$-$V_{T5}$ correspond to the threshold voltages. The DC controller 201 determines, out of a plurality of output voltages of the piezoelectric transformer 101 detected in S101 during the sweep operation, a voltage that falls within an acceptable range from any of the threshold voltages, as a candidate for an initial value of a voltage corresponding to the initial value of the drive frequency. Here, the acceptable range of the output voltage may be, for example, set to be a range within which the difference between the threshold voltage and the output voltage is substantially negligible. The DC controller 201 holds the determined voltage as a candidate for an initial value and a drive frequency corresponding to the voltage as a candidate for an initial value, in association with each other, in a storage device, such as the storage unit 2051 or the like.

Thereafter, in S106, the CPU 207 of the DC controller 201 identifies, out of the voltages as candidates for an initial value held in the storage unit 2051, a voltage having the smallest difference from a target voltage within the frequency range identified in S103. The CPU 207 also sets the identified frequency as the initial value of the drive frequency that is to be used when starting the voltage control for causing the output voltage of the piezoelectric transformer 101 to approach a target voltage. For example, in FIG. 9, the difference between a voltage $V_{T3}$ as a candidate for an initial value and the target voltage is the smallest, and therefore, a frequency $f_{T3}$ corresponding to $V_{T3}$ is set as the initial value of the drive frequency (control start position). When the aforementioned initial value setting process in S106 is ended, control proceeds to S107. By thus determining a voltage as a candidate for an initial value based on a plurality of threshold voltages, and setting a drive frequency corresponding to the voltage as a candidate for an initial value as the initial value of the drive frequency, the control range of the drive frequency can be further limited. Therefore, the time that it takes for the output voltage of the piezoelectric transformer 101 to rise in S107 described below can be further reduced.

In S107, the CPU 207 performs the voltage control for causing the output voltage of the piezoelectric transformer 101 to approach a target voltage, starting from the initial value set in S106 of the frequency of the pulse signal generated by the frequency generation unit 2054. In S107, for example, the CPU 207 may perform the voltage control by changing the drive frequency, from the set initial value, in the amount of change that increases with increasing the difference between the detect output voltage and the target voltage every time the output voltage of the piezoelectric transformer 101 is detected. The CPU 207 may also change the drive frequency in the following direction so as to increase (or decrease) the output voltage. Specifically, when the frequency corresponding to the next peak value detected in S103 is located on the lower-frequency side of the frequency corresponding to the highest peak value, the drive frequency may be increased to increase the output voltage, or conversely, the drive frequency may be decreased to decrease the output voltage. On the other hand, when the frequency corresponding to the next peak value detected in S103 is located on the higher-frequency side of the frequency corresponding to the highest peak value, the drive frequency may be decreased to increase the output voltage of the piezoelectric transformer, or conversely, the drive frequency may be increased to decrease the output voltage of the piezoelectric transformer.

When, by the process of S107, the output voltage of the piezoelectric transformer 101 becomes equal to the target voltage, or the error between the output voltage and the target voltage falls within a predetermined acceptable range, control proceeds to S108. In S108, the CPU 207 determines various settings for starting actual printing, and starts a (continuous) print process.

As described above, the power supply apparatus of this embodiment detects voltages that are output from the piezoelectric transformer in response to a plurality of pulse signals having different frequencies within a predetermined range in order to set the initial value of the drive frequency of a pulse signal for driving the piezoelectric transformer. Also, the power supply apparatus detects peak values from changes in detected voltages depending on the drive frequency, and identifies a frequency corresponding to the highest peak value, and a frequency corresponding to a next peak value next to and on the higher- or lower frequency side of the frequency corresponding to the highest peak value. Moreover, the power supply apparatus sets the initial value of the drive frequency that is used when starting the voltage control for causing the output voltage of the piezoelectric transformer to approach a target voltage, within the range between the two identified frequencies. As a result, when the output voltage of the piezoelectric transformer is controlled to a target voltage, the influence of a spurious component included in the frequency characteristics of the piezoelectric transformer can be suppressed, and the time that it takes to reach the target voltage can be reduced.

Also, in this embodiment, a plurality of threshold voltages may be previously prepared for dividing the range of the output voltage of the piezoelectric transformer into a plurality of ranges, and an output voltage falling within an acceptable range from each of the threshold voltages may be determined as a value that is a candidate for an initial value. Moreover, of the determined voltages as candidates for an initial value, a drive frequency corresponding to a voltage having the smallest difference from a target voltage may be set as the initial value of the drive frequency. As a result, the control range of the drive frequency that is used to perform the voltage control for causing the output voltage of the piezoelectric transformer to approach the target voltage can be further limited. Therefore, the time that it takes for the output voltage to reach the target voltage can be further reduced.

Moreover, the threshold voltages can be set in various manners. For example, the output voltage range specific to each individual piezoelectric transformer may be divided into a plurality of ranges, depending on the number of divisions (or the division width) determined for the individual piezoelectric transformer. In this case, instead of previously preparing the threshold voltages, the threshold voltages can be determined, depending on the number of divisions (or the division width). Thus, when variations in frequency characteristics are present for each individual piezoelectric transformer, the voltage control range can be arbitrarily divided, depending on each individual piezoelectric transformer. As a result, the control range of the drive frequency of the piezoelectric transformer can be appropriately limited, whereby the time that it takes for the output voltage to reach a target voltage can be appropriately reduced for each individual piezoelectric transformer.

[Second Embodiment]

In the first embodiment, the initial value of the drive frequency of the piezoelectric transformer is set to a frequency corresponding to an output voltage close to a target voltage using a plurality of threshold voltages prepared for dividing the output voltage range. In the second embodiment, the initial value of the drive frequency of the piezoelectric transformer is set to a frequency corresponding to an output voltage closer to a target voltage than in the first embodiment. Note that, in the description that follows, only parts different from the first embodiment will be described for the sake of simplicity.

Figure 2:
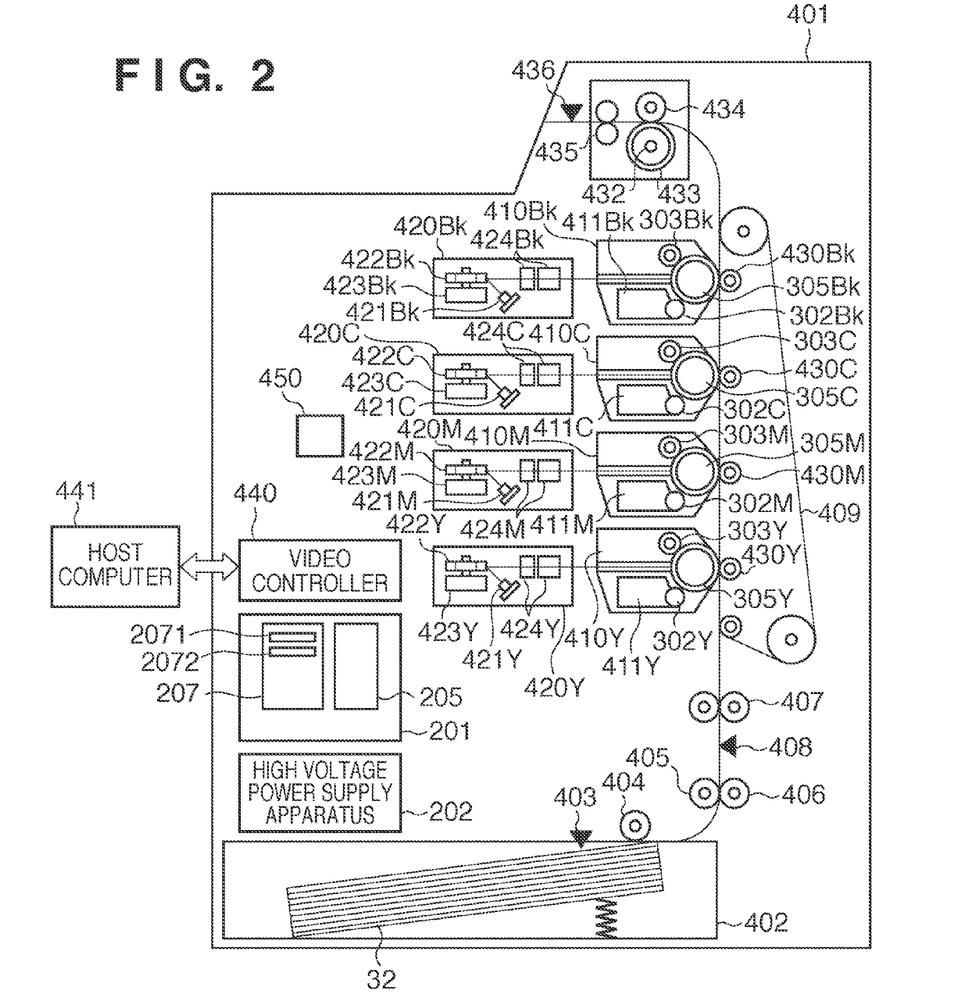
FIG. 2 is a diagram showing an example of a configuration of an image forming apparatus 401 according to the first embodiment.

The configurations of the high voltage power supply apparatus 202 and the laser printer 401 of this embodiment are similar to those of FIGS. 1 and 2 of the first embodiment. In FIG. 5 of the first embodiment, the A/D converter 2055 of the DC controller 201 temporarily stores the detected output voltage data of the piezoelectric transformer 101 into the storage unit 2051 in S101. The A/D converter 2055 can also overwrite data after peak value detection by the peak value detection unit 2056 with newly detected output voltage data, for example. Thus, the use efficiency of the storage area of the storage unit 2051 is improved. In contrast to this, in this embodiment, the detected output voltage data of the piezoelectric transformer 101 is held without being overwritten or the like, and the held data is used to set the initial value of the drive frequency.

Specifically, the storage unit 2051 holds a plurality of frequencies of pulse signals generated by the frequency generation unit 2054 in the sweep operation in S101, and the output voltages of the piezoelectric transformer 101 detected in S101 corresponding to the respective frequencies of pulse signals, in association with each other.

Figure 10:
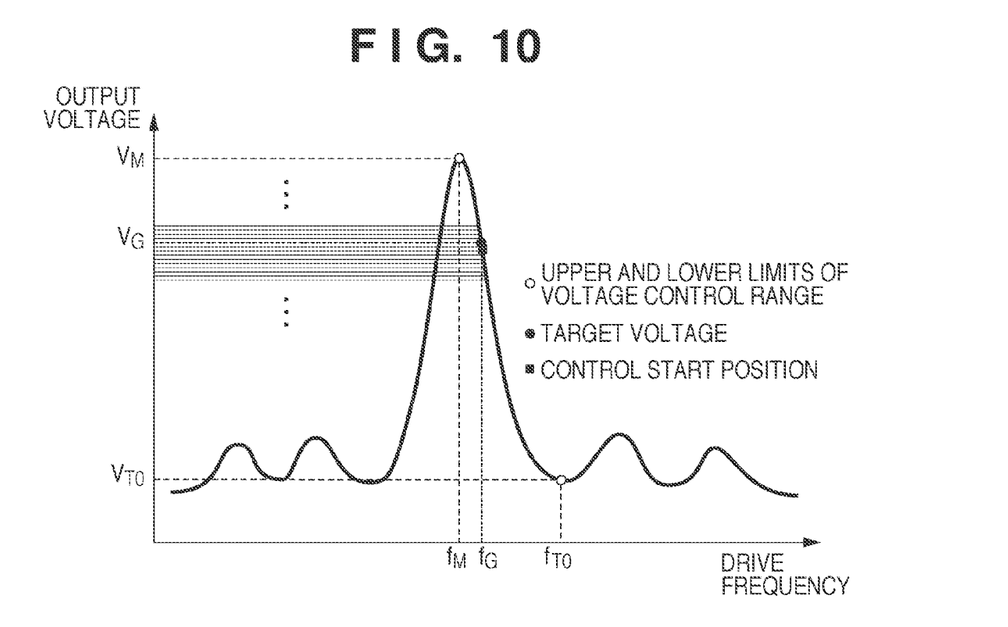
FIG. 10 is a diagram for describing setting of an initial value of a drive frequency for a piezoelectric transformer 101 according to a second embodiment.

Moreover, in S106, within the control range of the drive frequency identified in S103, a frequency that is associated with one of the output voltages held in the storage unit 2051 that has the smallest difference from a target voltage is set as the initial value of the drive frequency. For example, in FIG. 10, the identified control range of the drive frequency is assumed to be $f_M$-$f_{T0}$. In this case, the storage unit 2051 holds a large number of frequencies within the range, and a plurality of output voltages ($V_{T0}$-$V_M$) corresponding to the respective frequencies, in association with each other. In S106, the CPU 207 sets a frequency corresponding to one of the output voltages held by the storage unit 2051 that is closest to the target voltage $V_G$, as the initial value (control start position) of the drive frequency.

As described above, in the power supply apparatus of this embodiment, the storage unit 2051 holds a detected output voltage itself that has a higher resolution than that of data associated with a plurality of threshold voltages of the first embodiment. As a result, a frequency corresponding to an output voltage of the piezoelectric transformer that is closer to a target voltage than in the first embodiment, can be set as the initial value of the drive frequency that is used when the voltage control of the piezoelectric transformer is started. As a result, the rise time of the output voltage of the piezoelectric transformer can be further reduced than in the first embodiment.

[Third Embodiment]

In the first and second embodiments, it is assumed that the frequency characteristics of the piezoelectric transformer do not vary while the power supply has been activated, and the control range of the drive frequency of the piezoelectric transformer is identified mainly only at the time of activation of the power supply apparatus (image forming apparatus). The frequency characteristics of the piezoelectric transformer, however, may vary depending on an environment condition around the power supply apparatus. In this case, if a change occurs in the environment condition after the control range of the drive frequency is identified according to the first and second embodiments, a spurious component may be included in the control range, for example. Therefore, in the third embodiment, if a change occurs in the environment condition around the power supply apparatus, the identification of the control range of the drive frequency is performed again, and the setting of the initial value of the drive frequency is performed again, as described below.

The configurations of the high voltage power supply apparatus 202 and the laser printer 401 of this embodiment are similar to those of FIGS. 1 and 2 of the first embodiment. In this embodiment, the environment detection unit 450 provided in the laser printer 401 is an example of a environment measurement unit, and measures ambient temperature or humidity of the high voltage power supply apparatus 202 as an environment condition. Although, in this embodiment, as in FIG. 2, the environment detection unit 450 is provided in the laser printer 401, the environment detection unit 450 may be directly provided in the high voltage power supply apparatus 202. In any case, the environment detection unit 450 is required to measure an environment condition around the high voltage power supply apparatus 202.

Figure 11:
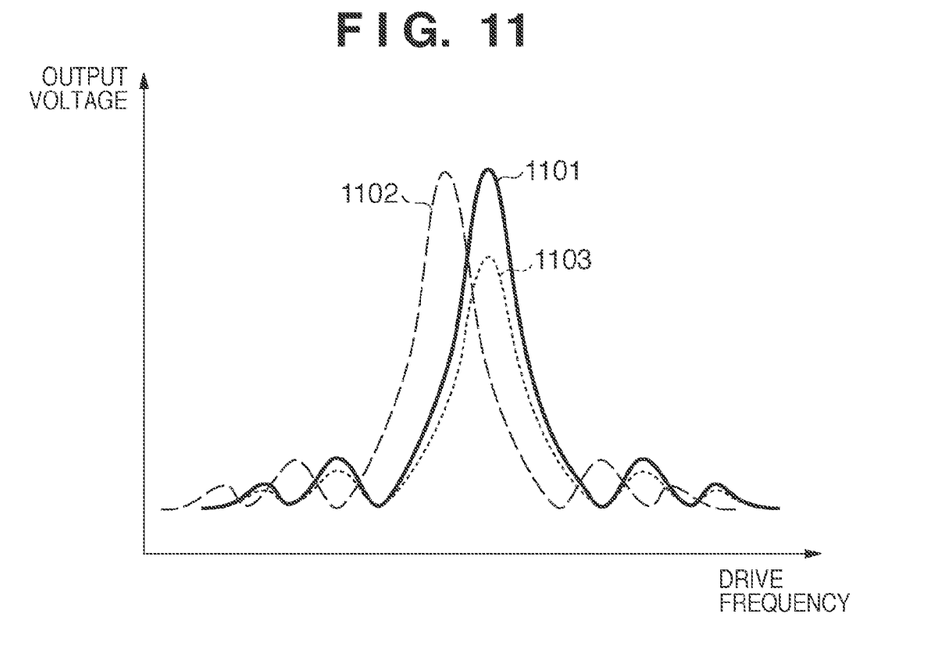
FIG. 11 is a diagram showing exemplary variations in frequency characteristics of a piezoelectric transformer 101 according to a third embodiment.

As shown in FIG. 11, the frequency characteristics of the piezoelectric transformer 101 vary depending on the environment condition around the high voltage power supply apparatus 202 as indicated by 1101-1103. When the frequency characteristics vary in the indicated manner, a spurious component may be included again in the control range of the drive frequency of the piezoelectric transformer 101 once identified in S103 of FIG. 5, for example. Therefore, if a change occurs in the environment condition, the identification of the control range of the drive frequency needs to be performed again, and the setting of the initial value of the drive frequency needs to be performed again.

Specifically, the CPU 207 of the DC controller 201 holds, by the storage unit 2051, data relating to the environment condition measured by the environment detection unit 450, and also detects a change in the environment condition. Thus, in this embodiment, the CPU 207 also functions as a change detection unit. The CPU 207, when detects a change in the environment condition from the data held by the storage unit 2051, resumes the sweep operation from S101, and performs the setting of the initial value in S106. For example, the CPU 207 determines whether or not the measured temperature or humidity falls within a predetermined range from the value stored in the storage unit 2051, thereby determining whether or not a change has occurred in the environment condition. Note that a timing at which the environment condition is measured or a timing at which the presence or absence of a change in the environment condition is determined may be set to be during image formation or during a standby state in which image formation is not being performed. If a change in the environment condition is detected during image formation, the above process may be performed after the image formation is completed. As a result, in this embodiment, in addition to the advantages of the first and second embodiments, the control range and the initial value of the drive frequency of the piezoelectric transformer can be advantageously and appropriately set, depending on the change in the environment condition.

Moreover, the CPU 207 may store into the storage unit 2051 the environment condition, and the control range of the drive frequency (a frequency corresponding to the highest maximum value of the output voltage and a frequency corresponding to a next peak value) identified in the environment condition, in association with each other, every time the environment condition is measured. For example, these data may be stored in the form of a table in the storage unit 2051. In this case, if a change is detected in the environment condition as described above, the CPU 207 determines whether or not data corresponding to the environment condition after the change is already stored in the storage unit 2051. Moreover, the CPU 207, when data corresponding to the environment condition after the change is stored in the storage unit 2051, may use the data to set the initial value in S106 instead of starting the process of S101. As a result, the setting of the initial value of the drive frequency of the piezoelectric transformer can be quickly performed without performing the sweep operation again.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-023547, filed Feb. 4, 2010, which is hereby incorporated by reference herein in its entirety.

What is claimed is:

1. A power supply apparatus comprising:
    a pulse generation unit that generates a pulse signal;
    a piezoelectric transformer that outputs a voltage according to a frequency of the pulse signal generated by the pulse generation unit;
    a control unit that controls the frequency of the pulse signal;
    a voltage detection unit that detects a plurality of voltages that are output from the piezoelectric transformer;
    a peak value detection unit that detects a plurality of peak values in the output voltages of the piezoelectric transformer according to a plurality of frequencies of the pulse signal;
    an identification unit that identifies a frequency corresponding to the highest peak value of the plurality of peak values detected by the peak value detection unit, and a frequency corresponding to a next peak value next to and on a higher- or lower-frequency side of the frequency corresponding to the highest peak value; and
    a setting unit that sets an initial frequency of the pulse signal that is used to cause the output voltage of the piezoelectric transformer to approach a target voltage, within a frequency range between the frequency corresponding to the highest peak value and the frequency corresponding to the next peak value identified by the identification unit,
    wherein the control unit further controls the pulse generation unit so that, when causing the output voltage of the piezoelectric transformer to approach the target voltage, the frequency of the pulse signal generated by the pulse generation unit is changed from the initial frequency set by the setting unit.

2. The power supply apparatus of claim 1, further comprising:
    a storage unit that stores a plurality of predetermined threshold voltages that are used to divide a range of the voltages output by the piezoelectric transformer into a plurality of ranges;
    a determination unit that determines a voltage that is a candidate for an initial value from the plurality of voltages detected by the voltage detection unit based on the plurality of threshold voltages; and
    a holding unit that holds the voltage as a candidate for an initial value and a frequency of the pulse signal corresponding to the voltage as a candidate for an initial value in association with each other,
    wherein the setting unit sets, as the initial frequency of the pulse signal, a frequency that falls within the frequency range between the frequency corresponding to the highest peak value identified by the identification unit and the frequency corresponding to the next peak value, and is associated with one of the voltages as candidates for an initial value held by the holding unit that has the smallest difference from the target voltage.

3. The power supply apparatus of claim 1, further comprising:
    a holding unit that holds the plurality of frequencies, and voltages corresponding to the respective frequencies detected by the voltage detection unit, in association with each other,
    wherein the setting unit sets, as the initial frequency of the pulse signal, a frequency that falls within the frequency range between the frequency corresponding to the highest peak value identified by the identification unit and the frequency corresponding to the next peak value, and is associated with one of the voltages held by the holding unit that has the smallest difference from the target voltage.

4. The power supply apparatus of claim 1, wherein
the control unit, when causing the output voltage of the piezoelectric transformer to approach the target voltage, then if the frequency corresponding to the next peak value is located at the lower-frequency side of the frequency corresponding to the highest peak value, increases the frequency of the pulse signal when increasing the output voltage of the piezoelectric transformer, and decreases the frequency of the pulse signal when decreasing the output voltage of the piezoelectric transformer, and the control unit, when causing the output voltage of the piezoelectric transformer to approach the target voltage, then if the frequency corresponding to the next peak value is located at the higher-frequency side of the frequency corresponding to the highest peak value, decreases the frequency of the pulse signal when increasing the output voltage of the piezoelectric transformer, and increases the frequency of the pulse signal when decreasing the output voltage of the piezoelectric transformer.

5. The power supply apparatus of claim 1, wherein
the control unit, when causing the output voltage of the piezoelectric transformer to approach the target voltage, controls the pulse generation unit so that the pulse generation unit changes the frequency of the pulse signal from the initial frequency set by the setting unit in an amount of change that increases with an increase in a difference between the voltage detected by the voltage detection unit and the target voltage.

6. The power supply apparatus of claim 1, further comprising:
an environment measurement unit that measures ambient temperature or humidity of the power supply apparatus as an environment condition; and
a change detection unit that detects a change in the environment condition measured by the environment measurement unit,
wherein, when the change detection unit detects a change in the environment condition, the setting unit sets the initial frequency.

7. The power supply apparatus of claim 6, further comprising:
a unit that stores the environment condition measured by the environment measurement unit, and the frequency corresponding to the highest peak value and the frequency corresponding to the next peak value identified by the identification unit, in association with each other,
wherein, when the change detection unit detects a change in the environment condition, then if the environment condition after the change is stored in the storage unit, the setting unit uses the stored data to set the initial frequency.

8. An image forming apparatus comprising:
a power supply apparatus including a pulse generation unit that generates a pulse signal, and a piezoelectric transformer that outputs a voltage according to a frequency of the pulse signal generated by the pulse generation unit; and
an image forming unit that forms an image on a recording paper,
wherein the power supply apparatus is used as a power supply for the image forming performed by the image forming unit,
wherein the power supply apparatus includes
a control unit that controls the frequency of the pulse signal;
a voltage detection unit that detects a plurality of voltages output from the piezoelectric transformer;
a peak value detection unit that detects a plurality of peak values in the output voltages of the piezoelectric transformer according to a plurality of frequencies of the pulse signal;
an identification unit that identifies a frequency corresponding to a highest peak value of the plurality of peak values detected by the peak value detection unit, and a frequency corresponding to a next peak value next to and on a higher- or lower-frequency side of the frequency corresponding to the highest peak value; and
a setting unit that sets an initial frequency of the pulse signal that is used to cause the output voltage of the piezoelectric transformer to approach a target voltage, within a frequency range between the frequency corresponding to the highest peak value and the frequency corresponding to the next peak value identified by the identification unit, and
wherein the control unit further controls the pulse generation unit so that, when causing the output voltage of the piezoelectric transformer to approach the target voltage, the frequency of the pulse signal generated by the pulse generation unit is changed from the initial frequency set by the setting unit.

* * * * *